United States Patent

Yamamoto et al.

(10) Patent No.: US 9,507,200 B2
(45) Date of Patent: Nov. 29, 2016

(54) METHOD OF MANUFACTURING IMAGE DISPLAY DEVICE AND METHOD OF SELECTING COLOR FILTER

(71) Applicant: NICHIA CORPORATION, Anan-shi, Tokushima (JP)

(72) Inventors: Atsushi Yamamoto, Komatsushima (JP); Takeshi Morikawa, Tokushima (JP); Koji Kajikawa, Tokushima (JP)

(73) Assignee: NICHIA CORPORATION, Anan-Shi (JP)

( * ) Notice: Subject to any disclaimer, the term of this patent is extended or adjusted under 35 U.S.C. 154(b) by 168 days.

(21) Appl. No.: 14/539,034

(22) Filed: Nov. 12, 2014

(65) Prior Publication Data

US 2015/0131043 A1    May 14, 2015

(30) Foreign Application Priority Data

Nov. 13, 2013  (JP) ................................. 2013-235501

(51) Int. Cl.
*G02F 1/1335* (2006.01)

(52) U.S. Cl.
CPC ............. *G02F 1/133516* (2013.01); *G02F 2001/133614* (2013.01)

(58) Field of Classification Search
CPC ............. G02F 1/133516; G02F 1/133509; G02F 1/133514; G02F 2001/133614
See application file for complete search history.

(56) References Cited

U.S. PATENT DOCUMENTS

| | | | | |
|---|---|---|---|---|
| 6,445,119 | B1 * | 9/2002 | Mori | H01J 61/44 313/483 |
| 7,535,524 | B2 * | 5/2009 | Chua | B82Y 10/00 349/68 |
| 2007/0268205 | A1 * | 11/2007 | Sasaguri | C09K 11/584 345/30 |
| 2009/0184622 | A1 * | 7/2009 | Lee | C09K 11/665 313/485 |
| 2010/0091215 | A1 | 4/2010 | Fukunaga et al. | |
| 2011/0043101 | A1 * | 2/2011 | Masuda | C09K 11/0883 313/503 |
| 2012/0091912 | A1 * | 4/2012 | Brown Elliott | G02F 1/133603 315/294 |
| 2015/0295144 | A1 * | 10/2015 | Weiler | H01L 33/504 362/84 |

FOREIGN PATENT DOCUMENTS

| | | |
|---|---|---|
| JP | 2001-42115 A | 2/2001 |
| JP | 2009-212508 A | 9/2009 |
| JP | 2010-93132 A | 4/2010 |

\* cited by examiner

*Primary Examiner* — Anne Hines
*Assistant Examiner* — Jose M Diaz
(74) *Attorney, Agent, or Firm* — Andrews Kurth Kenyon LLP

(57) ABSTRACT

A method of manufacturing an image display device which is configured to produce high luminance while maintaining color reproductivity and a method of efficiently selecting a combination of a light emitting device and a color filter. A method of manufacturing an image display device includes preparing a light emitting device which has a light source, a green fluorescent material and a red fluorescent material activated with tetravalent manganese ions, and configured to emit light which includes a visible light region, providing a color filter candidate which include red, green, and blue pixels in which the ratio of an integral value of the wavelength range of 560 to 640 nm with respect to the ratio of an integral value of the wavelength range of 460 to 640 nm in a spectral transmittance curve of the green pixel is 23% or greater, providing a color filter configured to satisfy a NTSC ratio of 65% or greater when the color filter candidate and the light emitting device are combined, and constructing an image display device with the use of the color filter, the light emitting device, and a controlling member for optical transmission.

11 Claims, 4 Drawing Sheets

METHOD OF MANUFACTURING IMAGE DISPLAY DEVICE AND METHOD OF SELECTING COLOR FILTER

CROSS-REFERENCE TO RELATED APPLICATION

This application claims priority to Japanese Patent Application No. 2013-235501, filed on Nov. 13, 2013. The entire disclosure of Japanese Patent Application No. 2013-235501 is hereby incorporated herein by reference.

BACKGROUND

1. Technical Field

The present disclosure relates to a method of manufacturing an image display device and a method of selecting a color filter.

2. Background Art

Liquid crystal display devices have been rapidly popularized in numerous areas of usage, competition on the manufacturing cost and the image quality has been intensifying every year. In all kinds of liquid crystal display devices, higher contrast, higher response speed, higher color reproduction, high luminance, and the like have been required. Among those, higher color reproductivity and higher luminance depend on the backlight light source and the color filter used in the liquid crystal display device, and simultaneous achievement of both the higher color reproductivity and higher luminance in high level compared to that of the conventional liquid crystal display devices has been in demand.

Alternative to a cold-cathode fluorescent tube which is a conventional backlight light source, an LED-type backlight light source has been known for its long operational life, high luminance, and mercury-free property. In such an LED-type backlight, blue-light emitted from an LED and yellow-light emitted from a YAG-based fluorescent material which is excited by the blue light are used for a white-light light source. However, higher color reproductivity than that obtained by such a white-light light source has been in demand.

Relating to the above, a color-image display device which employs a backlight-light source made of a combination of a blue or a deep-blue LED and a fluorescent material, and a color filter configured to block excessive wavelength in the blue-region inherent to an LED backlight has been known, which is supposed to be able to realize a color image display device with a high luminance when it is designed for a high color reproduction range, for example, see JP 2006-47975A.

Also, it has been known a color image display device which includes a solid light emitting element configured to emit light in a specific wavelength region, and a semiconductor light emitting device which include a green fluorescent material and a red fluorescent material respectively having specific emission peak. A virtual color filter is simulated based on the emission spectrum of the semiconductor light emitting device to fit in a certain range of the NTSC ratio. In a virtual color image display device having a virtual color filter which is simulated as described above, optical utilization efficiencies at two points whose NTSC ratios are in the specific region are calculated. Using the two points, the relation between the optical utilization efficiencies and the NTSC ratios are determined in a linear function, and color image display elements that satisfy the linear function are employed in a known color image display device, for example, see JP 2009-212508 A. The color image display device is said to be able to achieve wide color reproductivity as the whole of an image without impairing brightness of the image and provide easy white balance adjustment.

Also, a semiconductor light emitting device which has a semiconductor light emitting element, a green fluorescent material, and a red fluorescent material activated with $Mn^{4+}$ with a narrow half value width of the emission spectrum is known, and is said to be able to realize a display configured to display a deeper red color than a conventional red color, for example, see JP 2010-93132 A.

SUMMARY OF THE INVENTION

A method of manufacturing an image display device includes providing a light emitting device which has a light source, a green fluorescent material and a red fluorescent material activated with tetravalent manganese ions, and configured to emit light which includes a visible light region, providing a color filter candidate which include red, green, and blue pixels in which the ratio of an integral value of the wavelength range of 550 to 640 nm with respect to the ratio of an integral value of the wavelength range of 460 to 640 nm in a spectral transmittance curve of the green pixel is 33% or greater, providing a color filter configured to satisfy a NTSC ratio of 65% or greater when the color filter candidate and the light emitting device are combined, and constructing an image display device with the use of the color filter, the light emitting device, and a controlling member for optical transmission.

A method of manufacturing an image display device includes providing a light emitting device which has a light source, a green fluorescent material and a red fluorescent material activated with tetravalent manganese ions, and configured to emit light which includes a visible light region, providing a color filter candidate which include red, green, and blue pixels in which the ratio of an integral value of the wavelength range of 560 to 640 nm with respect to the ratio of an integral value of the wavelength range of 460 to 640 nm in a spectral transmittance curve of the green pixel is 23% or greater, providing a color filter configured to satisfy a NTSC ratio of 65% or greater when the color filter candidate and the light emitting device are combined, and constructing an image display device with the use of the color filter, the light emitting device, and a controlling member for optical transmission.

The method of manufacturing an image display device which is configured to produce high luminance while maintaining color reproductivity can be provided.

DETAILED DESCRIPTION OF THE INVENTION

Figure 1:
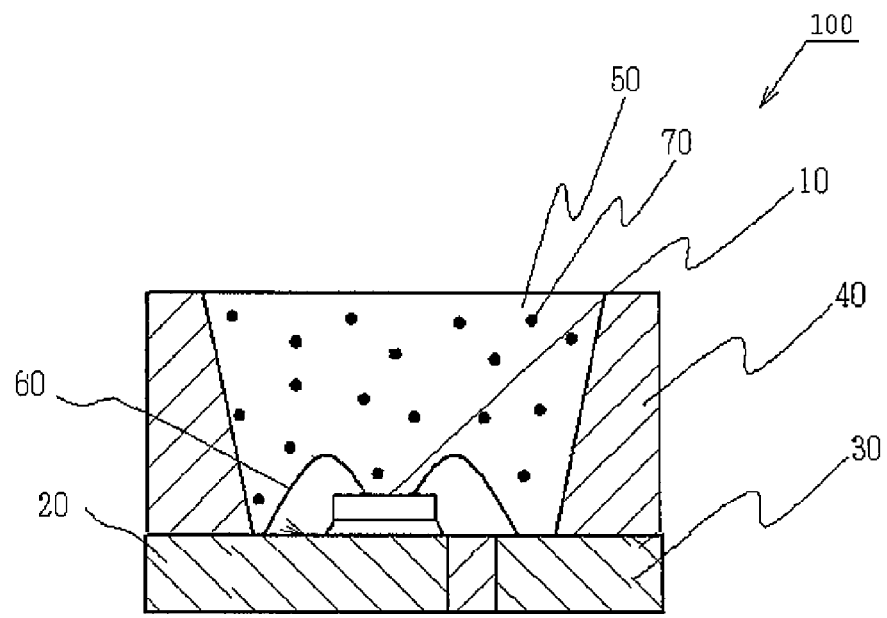
FIG. 1 is a schematic cross-sectional view of a light emitting device according to an embodiment of the present invention.

The color image display device described in JP 2006-47975A requires a combined usage of a certain backlight light source and a color filter which contains a certain blue pixel, and with some such a color filter, sufficient luminance or color reproducing region may not be achieved. The semiconductor light emitting device or/and the color image display device described in JP 2009-212508A and JP 2010-93132A may not be able to produce sufficient luminance when a wide color reproducing region to achieve with a certain color filter.

In view of circumstances as described above, an object of the present disclosure is to provide a method of manufacturing an image display device which is configured to produce high luminance while maintaining color reproductivity and a method of efficiently selecting a light emitting device and a color filter configured to be implemented in an image display device. The present disclosure includes the following embodiments.

A method of manufacturing an image display device includes providing a light emitting device which has a light source, a green fluorescent material and a red fluorescent material activated with tetravalent manganese ions, and configured to emit light which includes a visible light region, providing a color filter candidate which include red, green, and blue pixels in which the ratio of an integral value of the wavelength range of 550 to 640 nm with respect to the ratio of an integral value of the wavelength range of 460 to 640 nm in a spectral transmittance curve of the green pixel is 33% or greater, providing a color filter configured to satisfy a NTSC ratio of 65% or greater when the color filter candidate and the light emitting device are combined, and constructing an image display device with the use of the color filter, the light emitting device, and a controlling member for optical transmission. A method of manufacturing an image display device includes providing a light emitting device which has a light source, a green fluorescent material and a red fluorescent material activated with tetravalent manganese ions, and configured to emit light which includes a visible light region, providing a color filter candidate which include red, green, and blue pixels in which the ratio of an integral value of the wavelength range of 560 to 640 nm with respect to the ratio of an integral value of the wavelength range of 460 to 640 nm in a spectral transmittance curve of the green pixel is 23% or greater, providing a color filter configured to satisfy a NTSC ratio of 65% or greater when the color filter candidate and the light emitting device are combined, and constructing an image display device with the use of the color filter, the light emitting device, and a controlling member for optical transmission.

A method of selecting a color filter having each pixel of red, green, and blue colors for combining to a light emitting device which includes a light source, a green fluorescent material, and a red fluorescent material activated with tetravalent manganese ion and which is configured to emit light including visible light region, the selecting method includes providing a color filter candidate which include green pixel in which the ratio of an integral value of the wavelength range of 550 to 640 nm with respect to the ratio of an integral value of the wavelength range of 460 to 640 nm in a spectral transmittance curve of the green pixel is 33% or greater, and selecting a color filter configured to satisfy a NTSC ratio of 65% or greater when the color filter candidate and the light emitting device are combined. A method of selecting a color filter having each pixel of red, green, and blue colors for combining to a light emitting device which includes a light source, a green fluorescent material, and a red fluorescent material activated with tetravalent manganese ions and which is configured to emit light including visible light region, the selecting method includes providing a color filter candidate which include green pixel in which the ratio of an integral value of the wavelength range of 560 to 640 nm with respect to the ratio of an integral value of the wavelength range of 460 to 640 nm in a spectral transmittance curve of the green pixel is 23% or greater, and selecting a color filter configured to satisfy a NTSC ratio of 65% or greater when the color filter candidate and the light emitting device are combined.

A module for image display device which includes a color filter which can be selected according to the method described above and a light emitting device.

In view of circumstances as described above, an object of the present disclosure is to provide a method of manufacturing an image display device which is configured to produce high luminance while maintaining color reproductivity and a method of selecting a light emitting device and a color filter which are configured to be implemented in an image display device.

The embodiments according to the present invention will be described below with reference to the drawings. The preferred embodiments are intended as illustrative of a light emitting device and a method of manufacturing the light emitting device to give a concrete form to technical ideas of the present invention, and the scope of the invention is not limited to those described below. In the specification, the relation between the color names and the chromaticity coordinates, the relation between the range of wavelength of light and the color name of single color light, and the like conform to JIS Z8110. More specifically, 380 nm to 455 nm correspond to blue purple light, 455 nm to 485 nm correspond to blue light, 485 nm to 495 nm correspond to blue green light, 495 nm to 548 nm correspond to green light, 548 nm to 573 nm correspond to yellow green light, 584 nm to 610 nm correspond to yellow red light, and 610 nm to 780 nm correspond to red light.

In the specification, the term "process" refers not only an independent process but also a process which is indistinguishable from other processes but which can achieve an intended purpose. Also, a numerical range indicated using "to" in the present specification represents a range including numerical values described before and after "to" as a minimum value and a maximum value, respectively.

In an image display device, the color reproductivity and the luminance are in trade-off relation. The ideal spectral transmittance curve of each hue in a color filter which contains each pixels of RGB (Red, Green, and Blue) includes a range of the peak wavelength of an emission intensity curve (emission spectrum) of a light emitting device to be used as a backlight in an image display device, and has a sharp rising peak and a narrow half band width in each of the spectral transmittance curves. Thus, in order to widen color reproducing region of the image display device, a color filter thus configured may be selected. In each hue in the color filter, in order to reduce the half band width in a spectral transmittance curve in a specific wavelength range, an increase in the amount of the pigment contained in the color filter, an increase in the thickness of the color filter, or the like, can be performed. However, an increase of the pigment contained in a color filter or an increase in the thickness of the color filter may result in a reduction in the luminance.

With a conventional light emitting device which employs a white light light source which is configured to emit white light with the use of blue light emitted from an LED and yellow light emitted from a YAG fluorescent material which is excited by the blue light a considerable amount of emission has undesired wavelengths in view of color purity of red and green, due to the yellow-emitting fluorescent material. Examples of YAG-based fluorescent materials include $(Y, Lu)_3(Al, Ga)_5O_{12}$:Ce and $(Y, Ce)_3Al_5O_{12}$. In order to obtain an image display device which can represent sufficient color reproducing region with the use of a light emitting device which includes a blue LED and a YAG-based fluorescent material, such a display may be combined with a color filter which has, in the wavelength range of 460 nm to 640 nm, a half band width of 100 nm or less in a spectral transmittance curve of green pixel, and blocks light of 580 nm or less in a spectral transmittance curve of red pixel. However, with the use of a color filter which includes RGB pixels with a narrowed half band width in a specific wavelength range in a spectral transmittance curve of green pixel, and an spectral transmittance curve of red pixel shifted to the long-wavelength side, the luminance may be decreased.

A light emitting device combined with a color filter according to the present embodiments includes a red fluorescent material activated with tetravalent manganese ions ($Mn^{4+}$), so that emission with a red light of a high luminous efficiency and a sharp emission spectrum with a narrow half band width can be exhibited. In the case where an image display device is constructed with such a light emitting device, the overlapping in the emission spectra of red light and green light can be reduced, so that an image display device which can display red color and green color with high color purity can be obtained.

Figure 6:
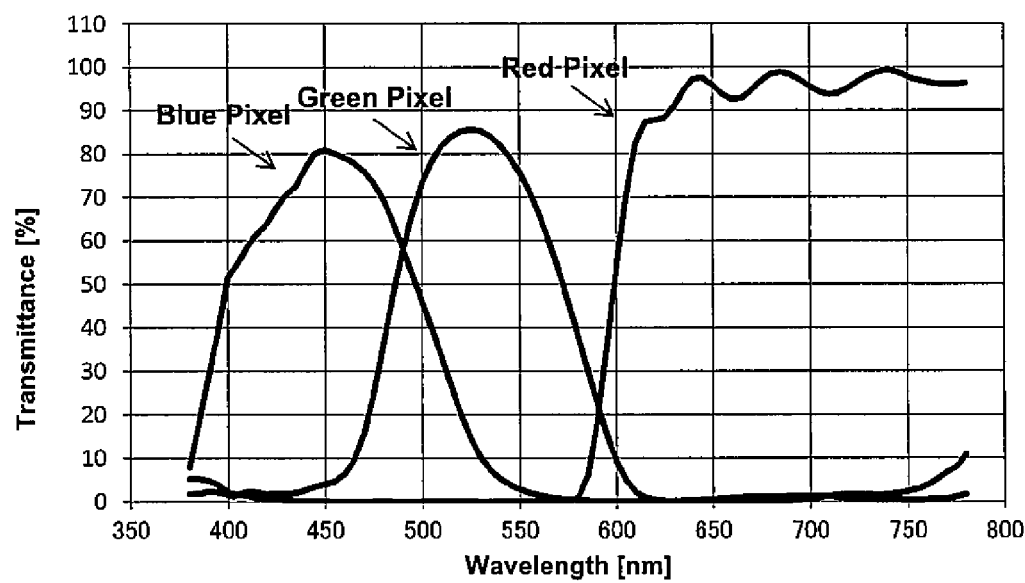
FIG. 6 is a diagram showing an example of spectra, where spectral transmittance curves of each of the pixels (RGB) of the color filter candidates which are subject to a selection according to an embodiment are shown superimposed.

The present embodiments provides an image display device of high luminance, in which while utilizing characteristics of a light emitting device which includes a light source, a green fluorescent material, and a red fluorescent material activated with tetravelent manganese ions, and is configured to emit light including a visible light region, maintaining color reproductivity which can be obtained in an image display device employing a combination of a light emitting device which includes a blue LED and a yellow YAG-based fluorescent material and a specific color filter, a color filter which can obtain high luminance is selected. The present embodiments provides a method of manufacturing an image display device configured to produce high luminance while maintaining sufficient color reproducing region, and a method of efficiently selecting a combination of a light emitting device and a color filter. The color filter is for being combined with a light emitting device which includes a red fluorescent material activated with tetravalent manganese ions while utilizing characteristics of a light emitting device which is configured to reduce overlapping of emission spectra of red light and green light. The method includes providing a color filter candidate for example, including RGB pixels and having relatively broad peak in the spectral transmittance curve of green pixel at long-wavelength side of 550 to 640 nm or 560 to 640 nm compared to a spectral transmittance curve of green pixels of a conventional color filter as shown in FIG. 6 and will be described below, and providing a color filter which can satisfy a NTSC ratio of 65% or greater when the color filter candidate and the light emitting device are combined. Further, the embodiments of the present invention provides a method of manufacturing an image display device configured to produce high luminance while maintaining sufficient color reproducing region, and a method of efficiently selecting a combination of a light emitting device and a color filter. The color filter is for being combined with a light emitting device which includes a red fluorescent material activated with tetravalent manganese ion while utilizing characteristics of a light emitting device which is configured to reduce overlapping of emission spectra of red light and green light. The method includes providing a color filter candidate including red pixel and having a spectral transmittance curve of red pixel shifted to short-wavelength side compared to a spectral transmittance curve of red pixel of a conventional color filter as shown in FIG. 6, and constructing an image display device.

Method of Manufacturing Image Display Device

A method of manufacturing an image display device includes providing a light emitting device which has a light source, a green fluorescent material and a red fluorescent material activated with tetravalent manganese ions, and configured to emit light which includes a visible light region (hereinafter may be referred to as a first process), providing a color filter candidate which include red, green, and blue pixels in which the ratio of an integral value of the wavelength range of 560 to 640 nm with respect to the ratio of an integral value of the wavelength range of 460 to 640 nm in a spectral transmittance curve of the green pixel is 33% or greater, the ratio of an integral value of the wavelength range of 560 to 640 nm is 23% or greater (hereinafter may be referred to as a second process), providing a color filter which can satisfy a NTSC ratio of 65% or greater when the color filter candidate and the light emitting device are combined (hereinafter may be referred to as a third process), and constructing an image display device with the use of the color filter, the light emitting device, and a controlling member for optical transmission (hereinafter may be referred to as a fourth process). An image display device produced with the use of the color filter and a light emitting device which satisfy the requirements described above can achieve high luminance while maintaining sufficient color reproductivity.

The image display device constructed according to a method of the present embodiments preferably satisfies a color reproduction range of a NTSC ratio being 65% or greater or 70% or greater, on the CIE 1931 chromaticity diagram. The NTSC ratio is the ratio of the area of a triangle defined by three chromaticity points red, green, blue of the display apparatus to be evaluated to the area of a triangle defined by the chromaticity points of three primary colors, red (0.670, 0.330), green (0.210, 0.710) and blue (0.140, 0.080), of the standard chromaticity (x, y) according to the CIE 1931 XYZ display color system established by the National Television Standards Committee of the USA. The area ratio described above is defined as a color reproduction range and it is determined the higher the ratio the higher is the color reproductivity.

The image display device produced according to a method of the present embodiments preferably satisfies a color reproduction range of Adobe RGB ratio being 95% or greater or 97% or greater, on the CIE 1931 chromaticity diagram. The Adobe RGB ratio is the ratio of the area of a triangle defined by three chromaticity points red, green, blue of the display apparatus to be evaluated to the area of a triangle defined by the chromaticity points of three primary colors, red (0.6400, 0.3300), green (0.2100, 0.7100) and blue (0.1500, 0.0600), of the standard chromaticity (x, y) according to the CIE 1931 XYZ display color system established by the Adobe System Incorporated. The area ratio described above is defined as a color reproduction range and it is determined the higher the ratio the higher is the color reproductivity.

The image display device produced according to a method of the present embodiments preferably satisfies a color reproduction range of a sRGB ratio being 95% or greater or 99% or greater, on the CIE 1931 chromaticity diagram. The sRGB ratio is the ratio of the area of a triangle defined by three chromaticity points red, green, blue of the display apparatus to be evaluated to the area of a triangle defined by the chromaticity points of three primary colors, red (0.6400, 0.3300), green (0.3000, 0.6000) and blue (0.1500, 0.0600), of the standard chromaticity (x, y) according to the CIE 1931 XYZ display color system established by the International Electrotechnical Commission. The area ratio described above is defined as a color reproduction range and it is determined the higher the ratio the higher is the color reproductivity.

First Process

In a first process, a light emitting device which includes a light source, a green fluorescent material, and a red fluorescent material activated with tetravalent manganese ions is provided. For the light emitting device, a light emitting device configured to exhibits desired characteristics can be provided by preparing it by using a known method or in view of desired light emitting characteristics, a light emitting device can be provided by appropriately selecting it from commercially available light emitting devices. A light emitting device may be selected from a light emitting device candidate which is provided so that a NTSC ratio is 65% or greater when the color filter candidate and the light emitting device candidate are combined.

The configuration of the light emitting device can be appropriately selected from configurations which are generally employed. For examples, the configuration of the light emitting device may include a light emitting element which serves as a light source being sealed with a sealing resin which contains a red fluorescent material and a green fluorescent material. The type of the light emitting device can be appropriately selected from types which are generally employed. Examples of the type of the light emitting device include a lamp-type and a surface-mounted type. Generally, a "lamp-type" refers that the shape of the sealing resin which constitutes external surface of the light emitting device has a lamp-shape. Meanwhile, a "surface-mounted type" refers that a light emitting element which serves as a light source and a sealing resin are placed in a recess-shaped housing. Furthermore, a type of a light emitting device in which a light emitting element which serves as a light source is mounted on a plate-shaped mounting substrate and a sealing resin is disposed in a lens shape to cover the light emitting element.

The present embodiments will be described below with reference to the drawings. FIG. 1 is a schematic cross-sectional view of a light emitting device according to an embodiment of the present invention. The light emitting device is an example of a surface-mounted type light emitting device. The light emitting device 100 includes a light emitting element 10 (light source) which is a gallium nitride-based compound semiconductor to emit a short-wavelength visible light (for example, 380 nm to 485 nm), and a molded body 40 where the light emitting element 10 is mounted. The molded body 40 includes a first lead 20 and a second lead 30 and is integrally molded with a thermoplastic resin or a thermosetting resin. A recess defined by a bottom surface and one or more side surfaces is formed in the molded body 40 and the light emitting element 10 is mounted on the bottom surface defining the recess. The light emitting element 10 has a pair of positive and negative electrodes and the pair of electrodes are respectively electrically connected with the first lead 20 and the second lead 30 through respective wires 60. The light emitting element 10 is sealed with a sealing member 50. For the sealing member 50, a thermosetting resin such as an epoxy resin, a silicone resin, an epoxy modified silicone resin, a modified silicone resin can be preferably used. The sealing member 50 contains a red fluorescent material and a green fluorescent material 70 to convert the wavelength of the light from the light emitting element 10.

The light source preferably has a maximum emission wavelength (emission peak wavelength) of 485 nm or less, more preferably 480 nm or less, and further preferably 460 nm or less. The lower-limit value of maximum emission wavelength is not specifically limited, but may be preferably 400 nm or greater and more preferably 440 nm or greater. With this, the red fluorescent material and the green fluorescent material can be efficiently excited and visible light can be effectively used. Also, with the use of a light source of the wavelength range as described above, a light emitting device with a high emission intensity can be obtained.

For the light emitting element, a semiconductor light emitting element such as an LED can be used. With the use of a semiconductor light emitting element as a light source, a light emitting device having a high linearity and a high efficiency and having high stability to mechanical impacts can be obtained. For the excitation light source of the light emitting devices, a light emitting element which can emit a light of a short-wavelength region of visible light can be used. For example, a light emitting element for emitting light of a blue color or a green color, a nitride-based semiconductor ($I_XAl_YGa_{1-X-Y}N$, $0 \le X$, $0 \le Y$, $X+Y \le 1$) etc., can be used.

The red fluorescent material is not specifically limited as long as the red fluorescent material is activated with tetravalent manganese ions and can be excited by the light emitted from the light source to emit a red light. In view of color reproduction range, the red fluorescent material preferably has a sharp emission spectrum with a narrow range, more preferably has an excitation wavelength of 400 nm to 600 nm, maximum emission wavelength of 610 nm to 670 nm, and a half band width of emission spectrum of 30 nm or less, and further preferably has an excitation wavelength of 400 run to 485 nm, maximum emission wavelength of 610 nm to 660 nm, and a half band width of emission spectrum of 20 nm or less.

Preferable examples of such a red fluorescent material activated with tetravalent manganese ions include a magnesium fluoro-germanate fluorescent material activated with tetravalent manganese ions exemplified in William M. Yen and Marvin J. Weber; 4.10 Miscellaneous Phosphors,Section 4. Phosphor Data. In *Inorganic Phosphors*; CRC: p 212, and a fluorescent material $M^1_2M^2F_6$:$Mn^{4+}$ ($M^1$=Li, Na, K, Rb, Cs; $M^2$=Si, Ge, Sn, Ti, Zr) exemplified in *Solid-state Science and Technology: In Journal of the Electrochemical Society*; July 1973, p 942.

A manganese fluoro-germanate fluorescent material activated with $Mn^{4+}$ can be efficiently excited with a blue light of 400 nm to 485 nm, and has a sharp emission spectrum with the half value width of 15 nm, also, the maximum emission wavelength is 658 nm and thus exhibits emission of deep red color. Also, $M^1_2M^2F_6$:$Mn^{4+}$ fluorescent material can be efficiently excited with a blue light of 400 nm to 485 nm, and has a sharp emission spectrum with the half value width of 8 nm, also, the maximum emission wavelength is 629 nm and thus exhibits emission of deep red color. Such a red fluorescent material has good wavelength matching with a red color filter commonly used in a liquid crystal display device or the like. Accordingly, in the case where such a light emitting device is used as a backlight of an image display device, a red light can be emitted with a high efficiency. In the embodiments, the term "deep color" refers to a color with which a wider color reproducing region can be obtained.

In view of color reproduction range, the red fluorescent material contained in the light emitting device is preferably at least one selected from a group consisting of manganese fluoro-germanate fluorescent material activated with $Mn^{4+}$ and a fluorescent material $M^1_2M^2F_6$:$Mn^{4+}$ ($M^1$=Li, Na, K, Rb, Cs; $M^2$=Si, Ge, Sn, Ti, Zr), more preferably a fluorescent material $M^1_2M^2F_6$:$Mn^{4+}$ ($M^1$=Li, Na, K, Rb, Cs; $M^2$=Si, Ge, Sn, Ti, Zr), and further preferably a fluorescent material $M^1_2M^2F_6$:$Mn^{4+}$ ($M^1$=K; $M^2$=Si, Ge). The amount of activator $Mn^{4+}$ in the red fluorescent material preferably satisfies $0<a<0.2$ in the case where the red fluorescent material is represented by the composition formula $M^1_2M^2_{1-a}Mn^{4+}_aF_6$.

The light emitting device includes a green fluorescent material in addition to the red fluorescent material. The green fluorescent material is preferably excited by the light emitted from the light source to emit a green light with the maximum emission wavelength in a range of 510 nm to 550 nm. In the case where the maximum emission wavelength of the green fluorescent material is in the range described above, good wavelength matching with the color filter can be obtained, which increase the luminance and widens the color reproduction range of green light.

In order that an image display device to exhibits a deeper green color with the use of the light emitting device, the half value width of the emission spectrum of the green fluorescent material is preferably 100 nm or less, and more preferably 80 nm or less.

Examples of such a green fluorescent material include a chlorosilicate fluorescent material activated with Eu and represented by a composition formula of $M^{11}_8MgSi_4O_{16}X^{11}$:Eu($M^{11}$=Ca, Sr, Ba, Zn; $X^{11}$=F, Cl, Br, I), a silicate fluorescent material activated with Eu and represented by $M^{12}_2SiO_4$:Eu($M^{12}$=Mg, Ca, Sr, Ba, Zn), a β-sialon fluorescent material activated with Eu and represented by $Si_{6-z}Al_zO_zN_{8-z}$:Eu($0<z\le4.2$), a thiogallate fluorescent material activated with Eu and represented by $M^{13}Ga_2S_4$:Eu($M^{13}$=Mg, Ca, Sr, Ba), a rare earth aluminate fluorescent material represented by a composition formula of $(Y, Lu)_3(Al, Ga)_5O_{12}$:Ce, and a lanthanum silicon nitride-based fluorescent material represented, for example, by $La_3Si_6N_{11}$:Ce. Among those, in view of color reproduction range, the green fluorescent material is preferably at least one selected from a group consisting of a chlorosilicate fluorescent material activated with Eu, a silicate fluorescent material activated with Eu, a β-sialon fluorescent material activated with Eu, a thiogallate fluorescent material activated with Eu, and a rare earth aluminate fluorescent material, and more preferably a β-sialon fluorescent material activated with Eu. It is more preferable that such a β-sialon fluorescent material activated with Eu preferably has a narrow half value width of the emission spectrum and the maximum emission wavelength is in a short wavelength region, as illustrated in WO 2007/066733A.

The light emitting device includes a light source, a red fluorescent material, and a green fluorescent material, and preferably satisfies one of the configurations shown below in view of the luminance and the color reproductivity to be exhibited by an image display device which incorporates the light emitting device.

(1) A light emitting device has a light source of a semiconductor light emitting element, the red fluorescent material having an excitation wavelength of 400 nm to 600 nm, and the maximum emission wavelength in 610 nm to 670 nm, and a half value width of the emission spectrum being 30 nm or less.

(2) A light emitting device has a light source of a semiconductor light emitting element with the maximum emission wavelength of 460 nm or less, the red fluorescent material having an excitation wavelength of 400 nm to 600 nm, and the maximum emission wavelength in 610 nm to 670 nm, and a half value width of the emission spectrum being 30 nm or less.

(3) A light emitting device has a light source of a semiconductor light emitting element with the maximum emission wavelength of 460 nm or less, the red fluorescent material having an excitation wavelength of 400 nm to 600 nm, and the maximum emission wavelength in 610 nm to 670 nm, and a half value width of the emission spectrum being 30 nm or less, and a green fluorescent material which is a fluorescent material activated with europium (Eu).

(4) A light emitting device in which the light source is a semiconductor light emitting element with the maximum emission wavelength of 460 nm or less, the red fluorescent material is at least one fluoride fluorescent material selected from a group consisting of a manganese fluoro-germanate fluorescent material activated with $Mn^{4+}$ and a fluorescent material $M^1_2M^2F_6$:$Mn^{4+}$ ($M^1$=Li, Na, K, Rb, Cs; $M^2$=Si, Ge, Sn, Ti, Zr), and the green fluorescent material is at least one fluoride fluorescent material selected from a group consisting of a chlorosilicate fluorescent material activated with Eu, a silicate fluorescent material activated with Eu, a β-sialon fluorescent material activated with Eu, a thiogallate fluorescent material activated with Eu, a rare earth aluminate fluorescent material represented by $(Y, Lu)_3(Al, Ga)_5O_{12}$:Ce, and a lanthanum silicon nitride-based fluorescent material represented, for example, by $La_3Si_6N_{11}$:Ce.

(5) A light emitting device in which the light source is a semiconductor light emitting element with the maximum emission wavelength of 460 nm or less, the red fluorescent material is a fluorescent material represented by $M^1_2M^2F_6$:

$Mn^{4+}$($M^1$=K; $M^2$=Si, Ge), and the green fluorescent material is a a β-sialon fluorescent material activated with Eu represented by $M^{12}{}_2SiO_4$:Eu ($M^{12}$=Ca, Sr, Ba, Zn).

Second Process

In a second process, a color filter candidate is provided and it includes a red pixel, a green pixel and a blue pixel, in which the ratio of an integral value of the wavelength range of 550 to 640 nm with respect to the ratio of an integral value of the wavelength range of 460 to 640 nm in a spectral transmittance curve of the green pixel is 33% or greater, or an integral value of the wavelength range of 560 to 640 nm is 23% or greater. For the color filter candidate, a color filter which has a desired spectral transmissive property can be provided by preparing it by using a known method or in view of desired spectral transmissive property, or can be provided by appropriately selecting it from commercially available color filters.

A color filter candidate which is provided in a method according to the embodiments is configured so as to facilitate the characteristics of the emission spectrum of the light emitting device to be combined with, the ratio of an integral value of the wavelength range of 550 to 640 nm with respect to the ratio of an integral value of the wavelength range of 460 to 640 nm in a spectral transmittance curve of the green pixel is 33% or greater, or an integral value of the wavelength range of 560 to 640 nm is 23% or greater, and has a relatively broad peak in a spectral transmittance curve of the green pixel. In a color filter which includes RGB, a color filter in which the ratio of an integral value of the wavelength range of 550 to 640 nm with respect to the ratio of an integral value of the wavelength range of 460 to 640 nm in a spectral transmittance curve of the green pixel is 33% or greater, or a color filter in which the ratio of an integral value of the wavelength range of 550 to 640 nm with respect to the ratio of an integral value of the wavelength range of 460 to 640 nm in a spectral transmittance curve of the green pixel is 23% or greater, has a relatively broad peak in a spectral transmittance curve of the green pixel at a long wavelength side (550 to 640 nm or 560 to 640 nm) compared to the spectral transmittance curve of the green pixel of a conventional color filter as shown in FIG. 6 to be described below, for example.

Further, a color filter candidate which is provided in a method according to the present embodiments is configured so as to facilitate the characteristics of the light emitting device, the wavelength in the spectral transmittance curve at which the red pixel of the color filter has a transmittance of 80% is 605 nm or less, 50% is 590 nm or less, which are at shorter-wavelength side than that of a conventional spectral transmittance curve of red pixel. In a color filter candidate which has RGB, the wavelength in the spectral transmittance curve at which the red pixel of the color filter candidate has a transmittance of 80% at 605 nm or less, 50% at 590 nm or less, which are at shorter-wavelength side than that of a conventional spectral transmittance curve of red pixel.

The configuration of the color filter which is a color filter candidate can be appropriately selected from known configurations. Examples of the configurations of the color filter include a known configuration which includes a colored layer constituting pixel arranged on a light transmissive substrate such as a glass.

At the time of forming each pixel on a light-transmissive substrate of a color filter witch is a selection target of a method according to the present embodiments, pigments and layer thickness are optimized so that the peak wavelength in the red region and the green region in the emission spectrum of the light emitting device can be maximumly transmitted. In more detail, the white point, emission spectrum of the light emitting device and the chromaticity index of the color filter, the required NTSC ratio are calculated by using a color-matching system to set most suitable pigment and layer thickness.

The substrate used for the color filter preferably has a certain level of light transmittance to visible light, more preferably has a light transmittance of 80% or greater. Generally, a substrate used for a liquid crystal display device may be used, and examples thereof include a plastic substrate such as PET and a glass substrate, among those, a glass substrate may be generally used. A light-shading pattern may be formed on the substrate. The light-shading pattern may be a pattern made of a metal thin film such as chromium or a light-shading resin formed on a substrate in an earlier process by using a known technique.

Forming the pixel on the substrate can be made by using an appropriate known method such as an ink-jet method, a printing method, a photoresist method, or an etching method. In view of high definition, controlling of spectroscopic characteristics and reproducibility, a photoresist method is preferable. With a photoresist method, a color filter is formed such that a pigment is dispersed in a light-transmissive resin, then dispsersed in an appropriate solvent together with a photoinitiator and a polymerizable monomer to obtain a coloring composition, which is applied on a light-transmissive substrate to form a colored layer. The colored layer is then exposed to a pattern and is developed to form a single color pixel. Those operations are repeated to each color to obtain a color filter.

In the case where the colored layer which constitutes the color filter is formed by using a photoresit method, for example, a method shown below may be followed. A pigment for a coloring agent is dispersed in a light-transmissive resin, and mixed in an appropriate solvent together with a photoinitiator and a polymerizable monomer. Various methods can be used for dispersing a pigment which to serve as a coloring agent and a light-transmissive resin, such as a mill base method, a three-roller method, and a jet mill method, but the method is not limited to those.

Specific examples of organic pigments which can be used in the coloring composition to form the colored layer of the color filter will be shown below by the color index numbers. Examples of the red pigment include C.I. Pigment Red (PR) 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 246, 254, 255, 264, 272, 279, and so forth.

Examples of the yellow pigment include C. I. Pigment Yellow (PY) 150, 138, and PY 1, 2, 3, 4, 5, 6, 10, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 139, 144, 146, 147, 148, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214, and so forth.

Examples of the orange pigment include C.I.Pigment Orange 36, 43, 51, 55, 59, 61, 71, 73, and so forth.

Examples of the green pigment include C.I.Pigment Green (PG) 36 and PG 7, 10, 37, and so forth.

Examples of the blue pigment include C.I.Pigment Blue (PB) 15, 15:1, 15:2, 15:3, 15:4, 15:6, 16, 22, 60, 64, 80, and so forth.

Examples of the violet pigment include C.I.Pigment Violet (PV) 1, 19, 23, 27, 29, 30, 32, 37, 40, 42, 50, and so forth.

The organic pigments described above may be used singly or a combination of two or more pigments, according to the configuration or the like of the colored layer to obtain.

Also, in order to combine with the organic pigments described above to secure good coating performance, sensitivity, developability, and so forth, while balancing brightness and saturation, an inorganic pigment can also be used in combination to those. Examples of inorganic pigment include metal oxide powder, metal sulfide powder, metal powder, or the like, such as yellow lead, zinc yellow, red oxide (red iron oxide (III)), cadmium red, ultramarine blue, prussian blue, chromium oxide green, cobalt green. Further, for toning, a dye may be contained in a range not to lower the heat resistance.

The resin used for the coloring composition preferably has a transmittance in the visible light region 80% or greater, more preferably 95% or greater. Examples of such a resin include a thermoplastic resin, a thermosetting resin, and a photosensitive resin. For the light transmissive resin, as needed, a monomer or oligomer which is a precursor to be hardened by radiation irradiation to form a light transmissive resin, may be used singly or in combination of two or more kinds.

A detail of a resin, a photoinitiator, a polymerizable monomer, and a method of forming pixel by using those can be referred to the paragraphs 0102-0119 in JP 2009-76836A, for example.

A color filter candidate in which the ratio of an integral value of the wavelength range of 550 to 640 nm with respect to the ratio of an integral value of the wavelength range of 460 to 640 nm in a spectral transmittance curve of the green pixel is 33% or greater, or an integral value of the wavelength range of 560 to 640 nm is 23% or greater is provided.

Figure 2:
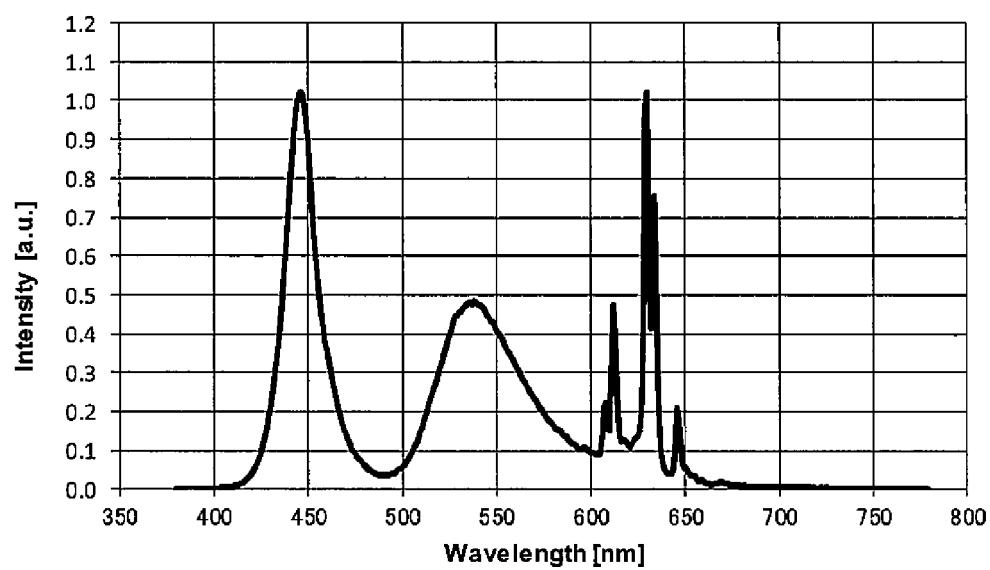
FIG. 2 is a diagram showing an example of emission spectrum of a light emitting device which includes a light source, a green fluorescent material, and a red fluorescent material activated with tetravalent manganese ions, the light emitting device is configured to emit light including a visible region.
Figure 3:
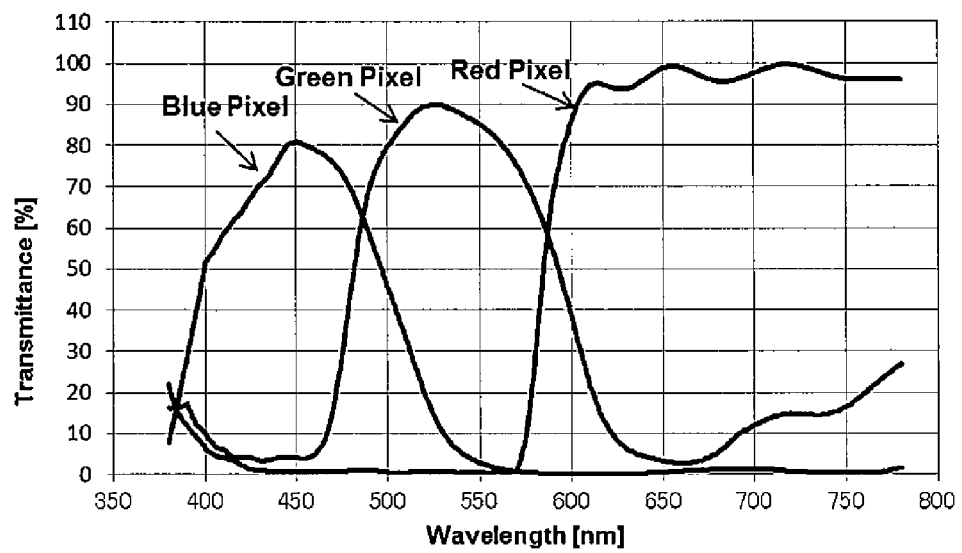
FIG. 3 is a diagram showing an example of spectra, where spectral transmittance curves of each of the pixels (RGB) of the color filter candidates which are subject to selecting according to an embodiment are shown superimposed.

FIG. 2 shows an example of spectrum representing intensity (a.u. (arbitrary unit)) on the vertical axis and wavelength on the horizontal axis, of the light emitted from a light emitting device which includes a light source, a green fluorescent material, and a red fluorescent material activated with tetravalent manganese ions, which is configured to emit light including a visible region. FIG. 3 shows an example of spectrum diagram representing transmittance (%) on the vertical axis and wavelength on the horizontal axis, showing spectral transmittance spectrum of each pixel (blue, green, red) of a color filter candidate which is subject to a selection according to an embodiment, are shown superimposed. FIG. 3 is an example of a spectral transmittance curve of a color filter candidate to be described below in an embodiment.

Figure 4:
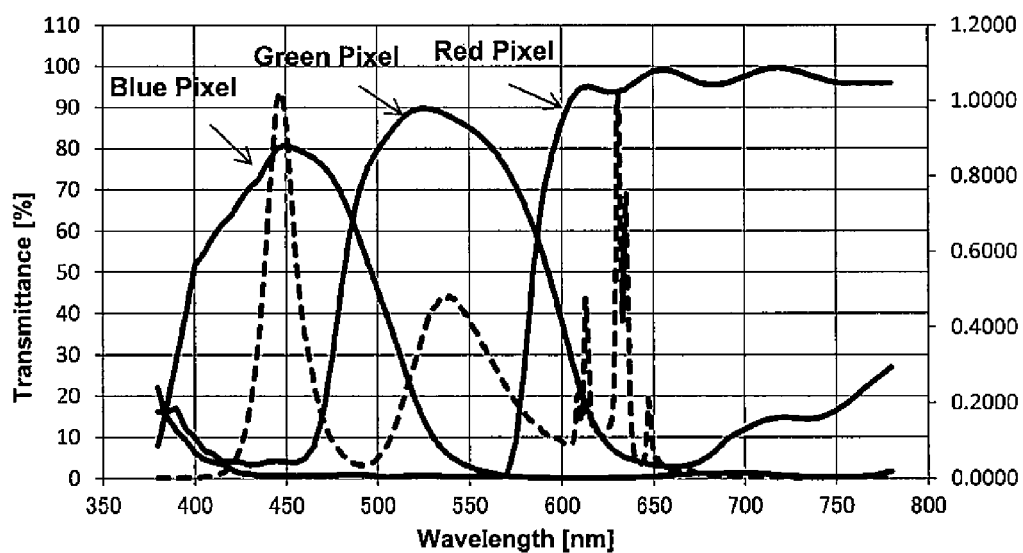
FIG. 4 is a diagram in which an emission spectrum of the light emitting device shown in FIG. 2 and the spectra of spectral transmittance curves of the color filter are shown superimposed.

FIG. 4 is a diagram in which an emission spectrum of the light emitting device shown in FIG. 2 and the spectra of spectral transmittance curves of the color filter candidate shown in FIG. 3 are shown superimposed. As shown in FIG. 2, FIG. 3, and FIG. 4, the peak wavelengths of the spectral transmittance spectrum of each pixel of the color filter candidate which is subjected to selection in a method according to the embodiments are in matching with the peak wavelengths of blue region, green region, and red region of the emission spectra of the light emitting device shown in FIG. 2, and thus light of peak wavelength in the blue region, the green region, and the red region from the light emitting device can be efficiently transmitted.

Also, as shown in FIG. 2, the emission spectrum of the light emitting device has a small overlapping of red light and green light. Therefore, the color filter candidate to combine with the light emitting device is, as shown in FIG. 3, configured so that the ratio of an integral value of the wavelength range of 550 to 640 nm with respect to the ratio of an integral value of the wavelength range of 460 to 640 nm in a spectral transmittance curve of the green pixel is 33% or greater. Also, the color filter candidate to be combined with the light emitting device whose emission spectrum is shown in FIG. 2 is configured so that, as shown in FIG. 3, the ratio of an integral value of the wavelength range of 560 to 640 nm with respect to the ratio of an integral value of the wavelength range of 460 to 640 nm in a spectral transmittance curve of the green pixel is 23% or greater. As shown in FIG. 3 and FIG. 4, in the method according to the embodiments, the color filter candidate which is subject to selection is configured to have a relatively broad peak at long-wavelength side (550 to 640 nm or 560 to 640 nm) in the spectral transmittance curve of green pixel compared to the spectral transmittance curve of green pixel of a conventional color filter such as shown in FIG. 6 to be described below. In a color filter candidate shown in FIG. 3 which can be subjected to selection according to the method in the embodiments, the ratio of an integral value of the wavelength range of 550 to 640 nm with respect to the ratio of an integral value of the wavelength range of 460 to 640 nm in a spectral transmittance curve of the green pixel is 40.05%. Also, a color filter candidate in which the ratio of an integral value of the wavelength range of 560 to 640 nm with respect to the ratio of an integral value of the wavelength range of 460 to 640 nm in a spectral transmittance curve of the green pixel is 31.74%.

Also, it is preferable that as shown in FIG. 2, the emission spectrum of the light emitting device has a small overlapping of red light and green light. Therefore, the color filter candidate to combine with the light emitting device is, as shown in FIG. 3, configured so that in the spectral transmittance curve of the red pixel, the transmittance of 80% is obtained at a wavelength of 605 nm or less, and the transmittance of 50% is obtained at a wavelength of 590 nm or less, in other words, the spectral transmittance curve of the red pixel is shifted to short-wavelength side. Of color filter candidates which have RGB, a color filter candidate configured so that in the spectral transmittance curve of the red pixel, the transmittance of 80% is obtained at a wavelength of 605 nm or less, and the transmittance of 50% is obtained at a wavelength of 590 nm or less, has a spectral transmittance curve of the red pixel shifted to the short-wavelength side compared to a conventional spectral transmittance curve of red pixel shown in FIG. 6 to be described below. In a color filter candidate shown in FIG. 3 which can be subjected to selection according to the method in the embodiments, the spectral transmittance curve of the red pixel has the transmittance of 80% is obtained at a wavelength of 596 nm, and the transmittance of 50% is obtained at a wavelength of 585 nm.

Also, a color filter which can be a color filter candidate has each pixel of red, green and blue, in which the ratio of an integral value of the wavelength range of 550 to 640 nm with respect to the ratio of an integral value of the wavelength range of 460 to 640 nm in a spectral transmittance curve of the green pixel is 33% or greater. Also, a color filter which can be a color filter candidate has the ratio of an integral value of the wavelength range of 550 to 640 nm with respect to the ratio of an integral value of the wavelength range of 460 to 640 nm in a spectral transmittance curve of the green pixel is preferably 35% or greater, and more preferably 38% or greater.

Also, a color filter which can be a color filter candidate has each pixel of red, green and blue, in which the ratio of an integral value of the wavelength range of 560 to 640 nm with respect to the ratio of an integral value of the wavelength range of 460 to 640 nm in a spectral transmittance curve of the green pixel is 23% or greater. Also, a color filter which can be a color filter candidate has the ratio of an integral value of the wavelength range of 560 to 640 nm with respect to the ratio of an integral value of the wavelength range of 460 to 640 nm in a spectral transmittance curve of the green pixel is preferably 25% or greater, and more preferably 28% or greater.

Further, it is preferable that in a color filter candidate which can be the color filter candidate, the spectral transmittance curve of the red pixel has the transmittance of 80% at a wavelength of 605 nm or less, and the transmittance of 50% at a wavelength of 590 nm or less. It is more preferable that in a color filter candidate which can be the color filter candidate, the spectral transmittance curve of the red pixel has the transmittance of 80% at a wavelength of 600 nm or less, and the transmittance of 50% at a wavelength of 587 nm or less.

Third Process

In a third process, a color filter is selected so that the NTSC ratio of 65% or greater can be obtained in combination of the light emitting device and a color filter candidate. Specific process of selecting the color filter may include obtaining the emission spectrum of the light emitting device, and based on the emission spectrum, selecting a color filter so that the NTSC ratio of 65% or greater can be obtained in combination of the light emitting device and a color filter candidate. The color filter is configured to obtain the NTSC ratio of preferably 68% or greater, more preferably 70% or greater when combined with the light emitting device.

Fourth Process

In a fourth process, an image display device is constructed with the use of the color filter, the light emitting device and a controlling member for optical transmission. More specifically, the image display device is constructed of the light emitting device and the color filter provided in the first process to the third process and a controlling member for optical transmission (for example liquid crystal or the like) and the like. In the fourth process, the controlling member for optical transmission is not specifically limited as long as it can be used in combination with the light emitting device and the color filter provided in the first process to the third process, and can be appropriately selected from conventionally known controlling members for optical transmission.

An image display device produced with a method of manufacturing according to the embodiments can achieve high luminance while maintaining sufficient color reproductivity.

Method of Selecting Color Filter

A method of selecting a color filter having each pixel of red, green, and blue colors for combining to a light emitting device which includes a light source, a green fluorescent material, and a red fluorescent material activated with tetravalent manganese ions and which is configured to emit light including visible light region, the method includes providing a light emitting device which includes a light source, a green fluorescent material, and a red fluorescent material activated with tetravalent manganese ions and which is configured to emit light including visible light region; providing a color filter candidate which includes green pixel in which the ratio of an integral value of the wavelength range of 550 to 640 nm with respect to the ratio of an integral value of the wavelength range of 460 to 640 nm in a spectral transmittance curve of the green pixel is 33% or greater; and selecting a color filter from the color filter candidate wherein the color filter candidate can satisfy a NTSC ratio of 65% or greater when the color filter candidate and the light emitting device are combined. A method of selecting a color filter having each pixel of red, green, and blue colors for combining to a light emitting device which includes a light source, a green fluorescent material, and a red fluorescent material activated with tetravalent manganese ions and which is configured to emit light including a visible light region, the method includes providing a light emitting device which includes a light source, a green fluorescent material, and a red fluorescent material activated with tetravalent manganese ions and which is configured to emit light including visible light region; providing a color filter candidate which includes green pixel in which the ratio of an integral value of the wavelength range of 560 to 640 nm with respect to the ratio of an integral value of the wavelength range of 460 to 640 nm in a spectral transmittance curve of the green pixel is 23% or greater; and selecting a color filter from the color filter candidate wherein the color filter candidate can satisfy a NTSC ratio of 65% or greater when the color filter candidate and the light emitting device are combined.

The details of providing a light emitting device in the method of selecting color filter may be similar to that described in the first process in the method of manufacturing an image display device, and preferable embodiments thereof are also similar to that described therein. The details of providing a color filter candidate in a method of selecting color filter may be similar to that described in the second process in the method of manufacturing an image display device described above, and preferable embodiments thereof are also similar to that described therein. The details of selecting a color filter candidate in a method of selecting color filter may be similar to that described in the third process in the method of manufacturing an image display device described above, and preferable embodiments thereof are also similar to that described therein.

Module for Image Display Device

A module for image display device includes a color filter and a light emitting device selected by the method of selecting according to the embodiments. Constituting an image display device with the use of the color filter and the light emitting device included in the module for image display device (preferably a liquid crystal display device), an image display device with high luminance while maintaining sufficient color reproducing region can be obtained. The module for image display device may include a light emitting device as a constitutional member of its backlight unit. That is, the module for image display device may include a backlight unit which includes a light emitting device and a color filter. In the specification, the term "backlight unit" refers to a combination of an optical member such as a reflecting sheet, a light guide plate, a diffusion sheet, and/or a lens sheet and a light emitting device.

Combining such a backlight unit and a color filter with a controlling member for optical transmission such as liquid crystal, a drive member of the light emitting device, and so forth, an image display device with excellent image display characteristics can be constructed. The color filter and the light emitting device included in the module for image display device are not specifically limited as long as the combination of the light emitting device and the color filter is as that described above.

Image Display Device

An image display device may be manufactured according to the method as described above or includes a light emitting device and a color filter which are selected according the method of selecting described above. An image display device is not specifically limited as long as manufactured according to a method as described above or includes a light emitting device and a color filter which are described above, and the constructed thereof can be appropriately selected from a conventionally known image display device. The image display device may be constructed with the light emitting device and the color filter with addition of a controlling member for optical transmission (for example liquid crystal) and so forth. An image display device can exhibits both high luminance and high color reproductivity with a light emitting device and a color filter which are selected according a method of selecting described above.

EXAMPLES

An embodiment of the present invention will be described below but the present invention is not limited thereto. Also, comparative embodiments will be described below along with the embodiment.

Manufacturing Example 1

Preparing Light Emitting Device 1

For a light emitting element, a semiconductor light emitting element (hereinafter may be referred to as "light emitting element 1") having a maximum emission wavelength (emission peak wavelength) of 447 nm was provided. For a red fluorescent material, a fluoride fluorescent material having a composition formula of $K_2SiF_6:Mn^{4+}$(hereinafter may be referred to as "KSF") was provided. For a green fluorescent material, a chlorosilicate fluorescent material represented by a composition formula of $M^{11}{}_8MgSi_4O_{11}X^{11}:Eu$ ($M^{11}$=Ca, Sr, Ba, Zn; $X^{11}$=F, Cl, Br, I), a silicate fluorescent material represented by $M^{12}{}_2SiO_4:Eu(M^{12}$=Mg, Ca, Sr, Ba, Zn), a β-sialon fluorescent material represented by $Si_{6-z}Al_zO_zN_{8-z}:Eu(0<z≤4.2)$, and a thiogallate fluorescent material represented by $M^{13}Ga_2S_4:Eu(M^{13}$=Mg, Ca, Sr, Ba) were provided. The provided light emitting element, red fluorescent material, and green fluorescent material were combined and a light emitting device 1 was prepared according to a conventional method. The light emitting device 1 included the light emitting element 1 with a peak wavelength of 447 nm, a β-sialon fluorescent material for the green fluorescent material with a peak wavelength of 540 nm and a half band width of 60 nm or less, and a KSF for the red fluorescent material with a peak wavelength of 629 nm and a half band width of 4 nm or less (≤4 nm). FIG. 2 shows an emission spectrum of the light emitting device 1.

Selection Example 1

Selecting Color Filter 1

The light emitting device 1 was allowed to emit light and the transmittance of each pixel of the light transmitted through a virtual color filter was simulated by calculation, and a color filter candidate 1 in which the ratio of an integral value of the wavelength range of 550 to 640 nm with respect to the ratio of an integral value of the wavelength range of 460 to 640 nm in a spectral transmittance curve of the green pixel is 33% or greater, or an integral value of the wavelength range of 560 to 640 nm is 23% or greater was provided. Also, the light emitting device 1 was allowed to emit light and the transmittance of each pixel of the light transmitted through a virtual color filter was simulated by calculation, and a color filter candidate 1 in which the spectral transmittance curve of the red pixel has the transmittance of 80% at a wavelength of 605 nm or less, and the transmittance of 50% at a wavelength of 590 nm or less was provided. FIG. 3 shows a spectrum diagram representing transmittance (%) on the vertical axis and wavelength on the horizontal axis, showing spectral transmittance spectrum of each pixel (blue, green, red) of a color filter candidate 1 which is subject to selecting according to an embodiment based on an emission spectrum of the light emitting device 1, are shown superimposed. In a color filter candidate 1 shown in FIG. 3, the ratio of an integral value of the wavelength range of 550 to 640 nm with respect to the ratio of an integral value of the wavelength range of 460 to 640 nm in a spectral transmittance curve of the green pixel was 40.05%. In a color filter candidate 1 shown in FIG. 3, the ratio of an integral value of the wavelength range of 560 to 640 nm with respect to the ratio of an integral value of the wavelength range of 460 to 640 nm in a spectral transmittance curve of the green pixel was 31.74%. Also, a half band width of the wavelength range of 460 to 640 nm in a spectral transmittance curve of the green pixel was about 110 nm and the half band with was greater than 100 nm. The color filter candidate shown in FIG. 3, the transmittance of 80% was obtained at a wavelength of 596 nm, and the transmittance of 50% was obtained at a wavelength of 585 nm in the spectral transmittance curve of the red pixel. Further, the NTSC ratio in a combination of the color filter candidate 1 and the light emitting device 1 was simulated and a color filter candidate 1 with a NTSC ratio of 65% or greater was selected as the color filter.

Figure 8:
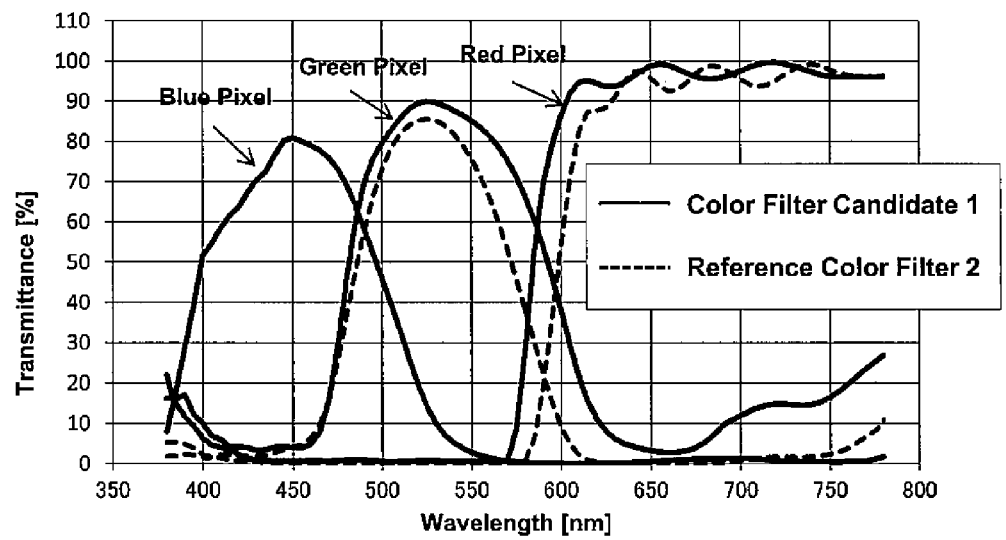
FIG. 8 is a diagram showing an example of superimposed spectra of spectral transmittance curves of each of the pixels (RGB) of the color filter candidates which are subject to selecting according to an embodiment and spectral transmittance curves of each of the pixels (RGB) of a conventional color filter which is combined with a light emitting device which contains an yellow-light emission YAG-based fluorescent material of an reference example.

As shown in FIG. 3 or FIG. 8 which to be described below, in the color filter candidate 1 the ratio of an integral value of the wavelength range of 550 to 640 nm with respect to the ratio of an integral value of the wavelength range of 460 to 640 nm in a spectral transmittance curve of the green pixel is 33% or greater (more specifically, 40.05%) has a relatively broad peak at long-wavelength side in the spectral transmittance curve of the green pixel. As shown in FIG. 3 or FIG. 8 which to be described below, in the color filter candidate 1 the ratio of an integral value of the wavelength range of 560 to 640 nm with respect to the ratio of an integral value of the wavelength range of 460 to 640 nm in a spectral transmittance curve of the green pixel is 23% or greater (more specifically, 31.74%) has a relatively broad peak at long-wavelength side in the spectral transmittance curve of the green pixel. Further, as shown in FIG. 3 or in FIG. 8 to be described below, in a color filter candidate 1, the wavelength in the spectral transmittance curve at which the red pixel of the color filter candidate has a transmittance of 80% at 605 nm or less (more specifically 596 nm), 50% at 590 nm or less (more specifically 585 nm), which are at shorter-wavelength side than that of a conventional spectral transmittance curve of red pixel.

FIG. 4 is a diagram in which an emission spectrum of the light emitting device land the spectral transmittance curves of the color filter 1 are shown superimposed. As shown in FIG. 4, with a combination of the light emitting device 1 manufactured according to Manufacturing Example 1 and the color filter selected according to a Selection Example 1 to construct an image display device, matching with the peak wavelengths of the blue region, the green region, and the red region of the emission spectrum of the light emitting device 1, efficiently transmitting light of each peak wavelength, and maintaining sufficient color reproducing region, an image display device which can achieve high luminance can be obtained.

Reference Manufacturing Example 1

Preparing Reference Light Emitting Device 2

Figure 5:
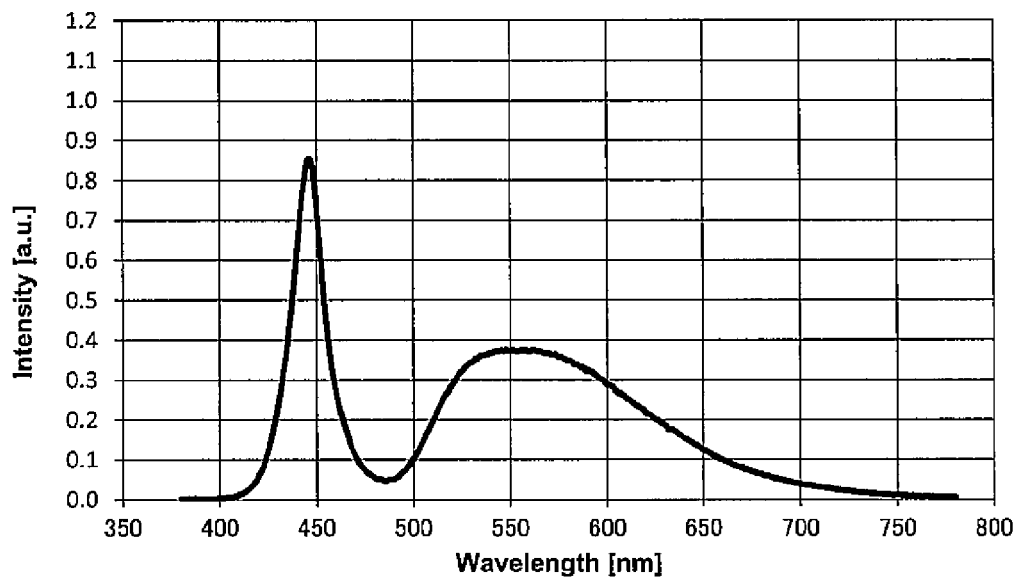
FIG. 5 is a diagram showing an example of emission spectrum of a light emitting device which includes a light source and an yellow-light emission YAG-based fluorescent material, the light emitting device is configured to emit light including a visible region.

For a light emitting element, a semiconductor light emitting element (hereinafter may be referred to as "light emitting element 1") having a maximum emission wavelength (emission peak wavelength) of 447 nm and a yellow fluorescent material of a YAG-based fluorescent material (Y, Ce)$_3$Al$_5$O$_{12}$ were provided, and the light emitting element 1 and the yellow fluorescent material are combined, and a reference light emitting device 2 was prepared according to a conventional method. FIG. 5 shows an emission spectrum of the reference light emitting device 2.

Reference Selection Example 2

Selecting Reference Color Filter 2

The reference light emitting device 2 was allowed to emit light and the transmittance of each pixel of the light transmitted through a virtual color filter was simulated by calculation. FIG. 6 shows a spectrum diagram representing transmittance (%) on the vertical axis and wavelength on the horizontal axis, showing spectral transmittance spectrum of each pixel (blue, green, red) of a virtual color filter based on a emission spectrum of the reference light emitting device 2, are shown superimposed. In order to obtain sufficient color reproducing region based on the emission spectrum of the reference light emitting device 2, the color filter candidate which to be selected is needed to have a combination of color filters having pixel of a red color a green color and a blue color, respectively, in which in the spectral transmittance curve of green pixel in a wavelength range of 460-640 nm has a relatively narrow half band width and a sharp peak, and in the spectral transmittance curve of red pixel in a wavelength range of 590 nm or greater has a sharp rising and shifted to the long wavelength side.

As shown in FIG. 6, the reference color filter 2 selected in the use of the reference light emitting device 2 which employs a combination of a yellow YAG fluorescent material whose emission includes a large amount of unnecessary wavelengths of light in terms of color purity of red and green and the light emitting element 1, exhibited that, with respect to the ratio of an integral value of the wavelength range of 460 to 640 nm in a spectral transmittance curve of the green pixel, the ratio of an integral value of the wavelength range of 550 to 640 nm of 29.60% and an integral value of the wavelength range of 560 to 640 nm of 20.50%. Also, a half band width of the wavelength range of 460 to 640 nm in a spectral transmittance curve of the green pixel was about 86 nm and the half band with was greater than 100 nm. The reference color filter 2 shown in FIG. 6, the transmittance of 80% was obtained at a wavelength of 610 nm, and the transmittance of 50% was obtained at a wavelength of 599 nm in the spectral transmittance curve of the red pixel. Further, the NTSC ratio in a combination of the reference color filter 2 and the reference light emitting device 2 was simulated and a reference color filter with a NTSC ratio of 65% or greater was selected.

As shown in FIG. 6, the reference color filter 2 does not satisfy the ratio of 33% or greater (the ratio in this case is 29.60%) for an integral value of the wavelength range of 550 to 640 nm with respect to the ratio of an integral value of the wavelength range of 460 to 640 nm in a spectral transmittance curve of the green pixel. Also, as shown in FIG. 6, the reference color filter 2 does not satisfy the ratio of 23% or greater (the ratio in this case is 20.50%) for an integral value of the wavelength range of 560 to 640 nm with respect to the ratio of an integral value of the wavelength range of 460 to 640 nm in a spectral transmittance curve of the green pixel. As shown in FIG. 6, the reference color filter 2 exhibits the spectral transmittance curve of the green pixel in a range of 400 to 610 nm which does not expand to 640 nm. Also as shown in FIG. 6 or FIG. 8 to be described below, the spectral transmittance curve of the green pixel of the reference color filter 2 has a sharper peak than the spectral transmittance curve of the green pixel of the reference color filter 1 shown in FIG. 3. Further as shown in FIG. 6, the reference color filter 2 exhibits the spectral transmittance curve of the red pixel in which the wavelength of the transmittance of 80% is not 605 nm or less (the wavelength in this case is 610 nm), and the wavelength of the transmittance of 50% is not 590 nm or less (the wavelength in this case is 599 nm). As shown in FIG. 6 or in FIG. 8 to be described below, the spectral transmittance curve of the red pixel of the reference color filter 2 is shifted to long-wavelength side than the spectral transmittance curve of the red pixel of the color filter candidate 1 of the present embodiment shown in FIG. 3.

Figure 7:
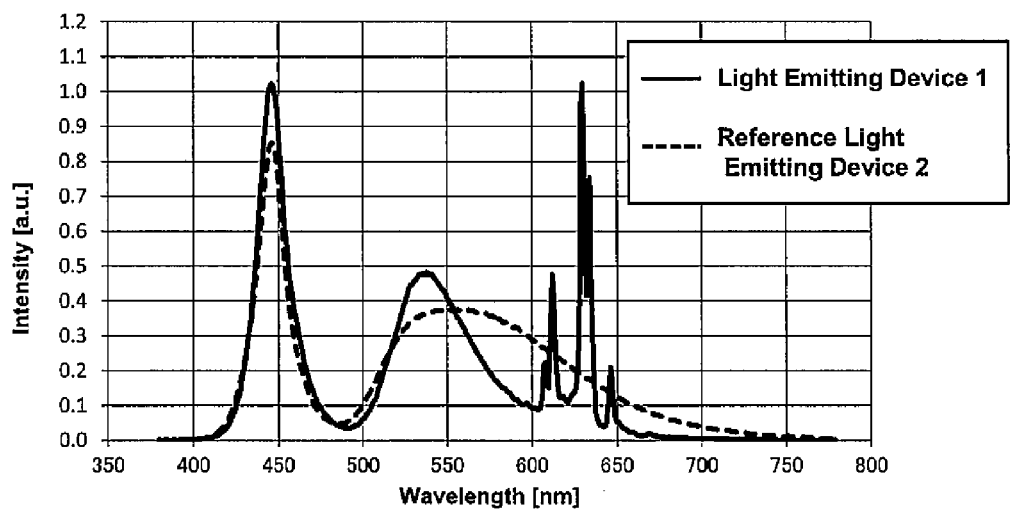
FIG. 7 is a diagram showing superimposed spectra of an emission spectrum of a light emitting device according to an embodiment and an emission spectrum of a light emitting device which includes an yellow-light emission YAG-based fluorescent material of an reference example.

In FIG. 7, the emission spectrum (solid line) of the light emitting device 1 and the emission spectrum (broken line) of the reference light emitting device 2 are shown superimposed. As shown in FIG. 7, from the emission spectrum (solid line in FIG. 7) of the light emitting device 1, a reduction of the overlapping between the emission spectra of red light and green light can be confirmed. On the other hand, the emission spectrum (broken line in FIG. 7) of the reference light emitting device 2 shows that a considerable amount of emission has undesired wavelengths in view of color purity of red and green, due to the yellow-emitting fluorescent material.

FIG. 8 is a spectral diagram in which a combination of the spectral transmittance spectra (solid lines) of each pixel of RGB (blue, green, red) of the color filter candidate 1 to be combined with the light emitting device 1 based on the emission spectrum of the light emitting device 1 and a combination of the spectral transmittance spectra (broken lines) of each pixel of RGB (blue, green, red) of the reference color filter 2 to be combined with the reference light emitting device 2 based on the emission spectrum of the reference light emitting device 2 are shown superimposed.

As shown in FIG. 8, in the spectral transmittance curves (solid lines) of the color filter candidate 1 which is combined with the light emitting device 1, the spectral transmittance curve of green pixel has a relatively broad peak compared to the spectral transmittance curves (broken lines) of the reference color filter 2 which is combined with the reference light emitting device 2. also as shown in FIG. 8, in the spectral transmittance curves (solid lines) of the color filter candidate 1, the spectral transmittance curve of the red pixel is shifted to the shorter-wavelength side compared to the spectral transmittance curves (broken lines) of the reference color filter 2.

The luminous flux (a.u.) and the radiant flux (a.u.) of the light emitting device 1 and the reference light emitting device 2 were measured. Also, the chromaticity (x, y) and the color reproductivity shown by sRGB inclusion ratio after passing each filter were simulated for an image display device having a combination of the light emitting device 1 and the color filter candidate 1 and for an image display device having a combination of the reference light emitting device 2 and the reference color filter 2. In the measurement, the luminance after transmission Y is equivalent to the utilization efficiency of the emission from each light emitting device. The results are shown in Table 1.

TABLE 1

|  | Reference Light Emitting Device 2 | | Light Emitting Device 1 | |
| --- | --- | --- | --- | --- |
| LED Luminous Flux [a.u.] | 1 | | 0.891 | |
| LED radiation flux [a.u.] | 1 | | 0.935 | |
|  | x | y | x | y |
| CF-transmitted-R | 0.642 | 0.331 | 0.639 | 0.328 |
| CF-transmitted-G | 0.294 | 0.614 | 0.298 | 0.610 |
| CF-transmitted-B | 0.154 | 0.066 | 0.154 | 0.059 |
| CF-transmitted-W | 0.293 | 0.316 | 0.293 | 0.317 |

TABLE 1-continued

|  | Reference Light Emitting Device 2 | Light Emitting Device 1 |
|---|---|---|
| sRGB InclusionRatio (%) | 99.2 | 99.4 |
| Transmitted Luminance Y [a.u.] | 1 | 1.151 |

From the results shown in Table 1, the image display device having a combination of the light emitting device 1 and the color filter candidate 1 exhibits a NTSC ratio of 65% or greater and a sRGB value of 99.4%, which indicates that while maintaining a sufficient color reproducibility, the image display device achieves a high luminance of the luminance after transmission Y of 1.151 compared to the luminance after transmission Y of 1 obtained by the image display device having a combination of the reference light emitting device 2 and the reference color filter 2.

As described above, constituting an image display device with a combination of a light emitting device and a color filter which are selected according to a method of the embodiments allows obtaining of a high luminance while maintaining sufficient color reproductivity which can satisfy a NTSC ratio of 65% or greater.

An image display device produced with the use of the color filter and a light emitting device which satisfy the requirements described above can achieve high luminance while maintaining sufficient color reproductivity.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

All publications, patent applications, and technical standards mentioned in this specification are herein incorporated by reference to the same extent as if each individual publication, patent application, or technical standard was specifically and individually indicated to be incorporated by reference.

What is claimed is:

1. A method of manufacturing an image display device comprising:
   providing a light emitting device which comprises a light source, a green fluorescent material and a red fluorescent material activated with tetravalent manganese ions and configured to emit light which comprises visible region light;
   providing a color filter candidate which comprises red, green, and blue pixels in which a ratio of an integral value of the wavelength range of 550 to 640 nm based on an integral value of the wavelength range of 460 to 640 nm in a spectral transmittance curve of the green pixel is 33% or greater,
   providing a color filter configured to satisfy a NTSC ratio of 65% or greater when the color filter candidate and the light emitting device are combined; and
   constructing an image display device of the color filter, the light emitting device, and a controlling member for optical transmission.

2. The method of manufacturing an image display device according to claim 1, wherein the ratio of an integral value of the wavelength range of 550 to 640 nm based on an integral value of the wavelength range of 460 to 640 nm in a spectral transmittance curve of the green pixel is 38% or greater.

3. The method of manufacturing an image display device according to claim 1, wherein in a spectral transmittance curve of red pixel of a color filter, a wavelength at 80% transmittance is 605 nm or less and a wavelength at 50% transmittance is 590 nm or less.

4. The method of manufacturing an image display device according to claim 1, wherein the green fluorescent material has an excitation wavelength of 400 nm to 600 nm, an emission wavelength of 510 nm to 550 nm, and a half value width of the emission spectrum is 100 nm or less.

5. The method of manufacturing an image display device according to claim 4, wherein the emission peak wavelength is 520 to 550 nm.

6. The method of manufacturing an image display device according to claim 1, wherein the red fluorescent material has an excitation wavelength of 400 nm to 600 nm, an emission wavelength of 610 nm to 670 nm, and a half value width of the emission spectrum is 30 nm or less.

7. The method of manufacturing an image display device according to claim 1, wherein the green fluorescent material comprises at least one selected from the group consisting of a chlorosilicate fluorescent material activated with Eu and represented by a composition formula of $M^{11}{}_8MgSi_4O_{16}X^{11}$:Eu($M^{11}$=Ca, Sr, Ba, Zn; $X^{11}$=F, Cl, Br, I), a silicate fluorescent material activated with Eu and represented by $M^{12}{}_2SiO_4$:Eu($M^{12}$=Mg, Ca, Sr, Ba, Zn), a β-sialon fluorescent material activated with Eu and represented by $Si_{6-z}Al_zO_zN_{8-z}$:Eu(O<z≤4.2), and a thiogallate fluorescent material activated with Eu and represented by $M^{13}Ga_2S_4$:Eu($M^{13}$=Mg, Ca, Sr, Ba).

8. The method of manufacturing an image display device according to claim 1, wherein the red fluorescent material comprises at least one selected from the group consisting of a fluorogermanate fluorescent material activated with $Mn^{4+}$ and $M^1{}_2M^2F_6$:$Mn^{4+}$($M^1$=Li, Na, K, Rb, Cs; $M^2$=Si, Ge, Sn, Ti, Zr).

9. The method of manufacturing an image display device according to claim 1, wherein an emission peak wavelength of a light source is 485 nm or less.

10. A method of selecting a color filter having each pixel of red, green, and blue colors for combining to a light emitting device which comprises a light source, a green fluorescent material, and a red fluorescent material activated with tetravalent manganese ions and which is configured to emit light including visible region light, the method comprising:
    providing a color filter candidate which comprises green pixel in which the ratio of an integral value of the wavelength range of 560 to 640 nm based on an integral value of the wavelength range of 460 to 640 nm in a spectral transmittance curve of the green pixel is 23% or greater, and selecting a color filter configured to satisfy a NTSC ratio of 65% or greater when the color filter candidate and the light emitting device are combined.

11. A module for image display device comprising a color filter selected by the method according to claim 10 and a light emitting device.

* * * * *